Patented Aug. 10, 1948

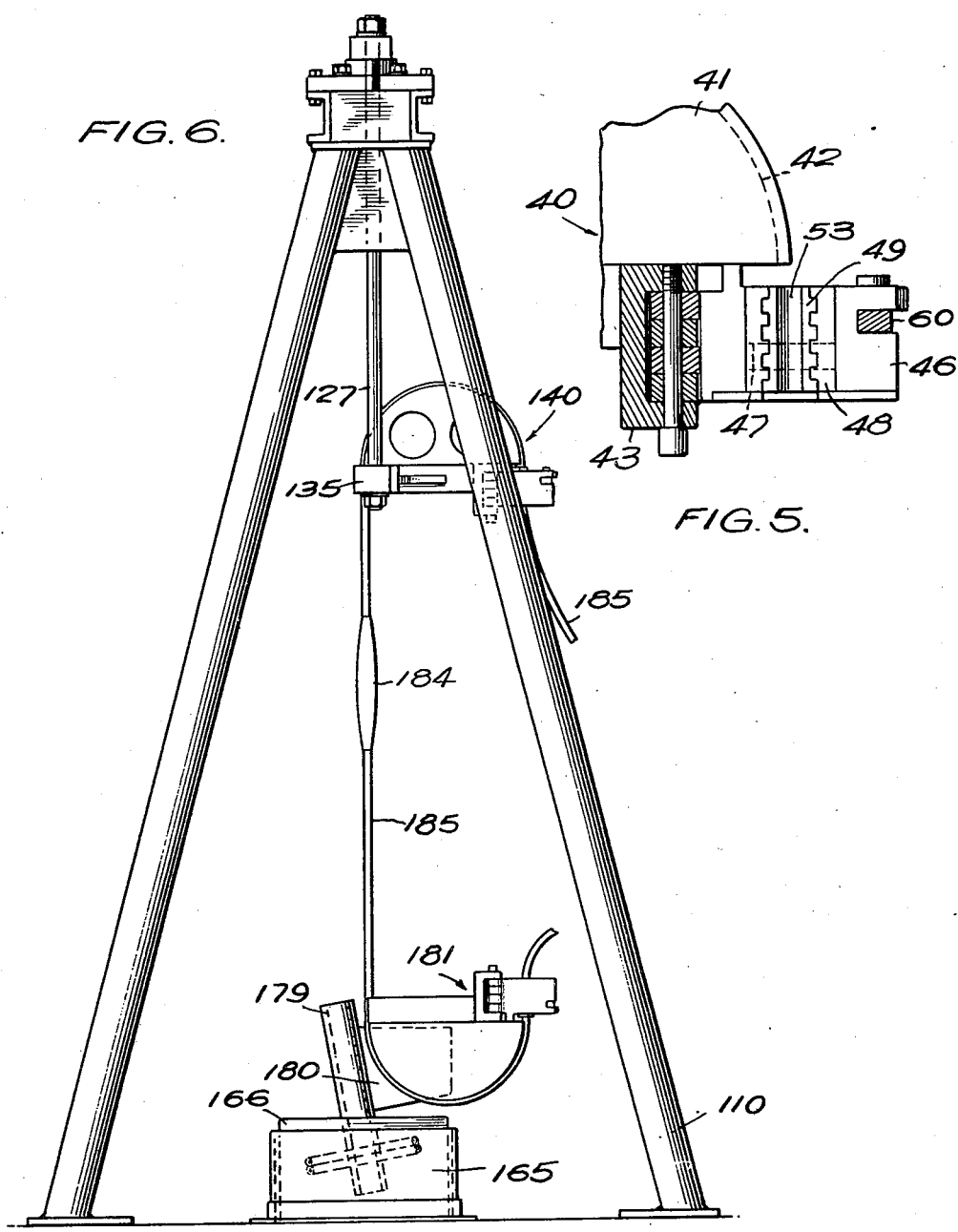

2,446,820

UNITED STATES PATENT OFFICE 2,446,820

APPARATUS FOR TESTING ELECTRIC CABLES

Richard D. Gambrill and Clay E. Lewis, Baltimore, Md., assignors to Western Electric Company, Incorporated, New York, N. Y., a corporation of New York Application April 4, 1944, Serial No. 529,495

7 Claims. (Cl. 175—183)

This invention relates to apparatus for testing cables, and has for its object the provision of new and improved apparatus for testing cables.

One apparatus embodying the invention comprises a frame, an air cylinder supported by a cross beam at the top of the frame, a yoke carried by the piston of the air cylinder, a clamp mounted on the yoke in which a cable to be tested may be secured, a weight, means carried by the weight for securing a cable thereto, and a test set for measuring characteristics of the cable while under the tension of the weight.

A complete understanding of the invention may be obtained from the following detailed description of a specific embodiment thereof, when read in conjunction with the appended drawings, in which Fig. 1 is a front elevation of an apparatus embodying the invention;

Fig. 5 is a vertical, fragmentary, partial section of a portion of the apparatus, and Fig. 6 is a side elevation of an apparatus constituting an alternative embodiment of the invention.

Referring more specifically to the drawings, two vertical A-shaped frames 10 and 11 (Figs. 1 and 2) are joined by spaced channels 12—12 bolted to the frames at the apices thereof. An air cylinder 15, rigidly secured between the central portions of the spaced channels 12—12 is provided with a vent 16 in which a pipe 17 is threaded.

Figure 3:
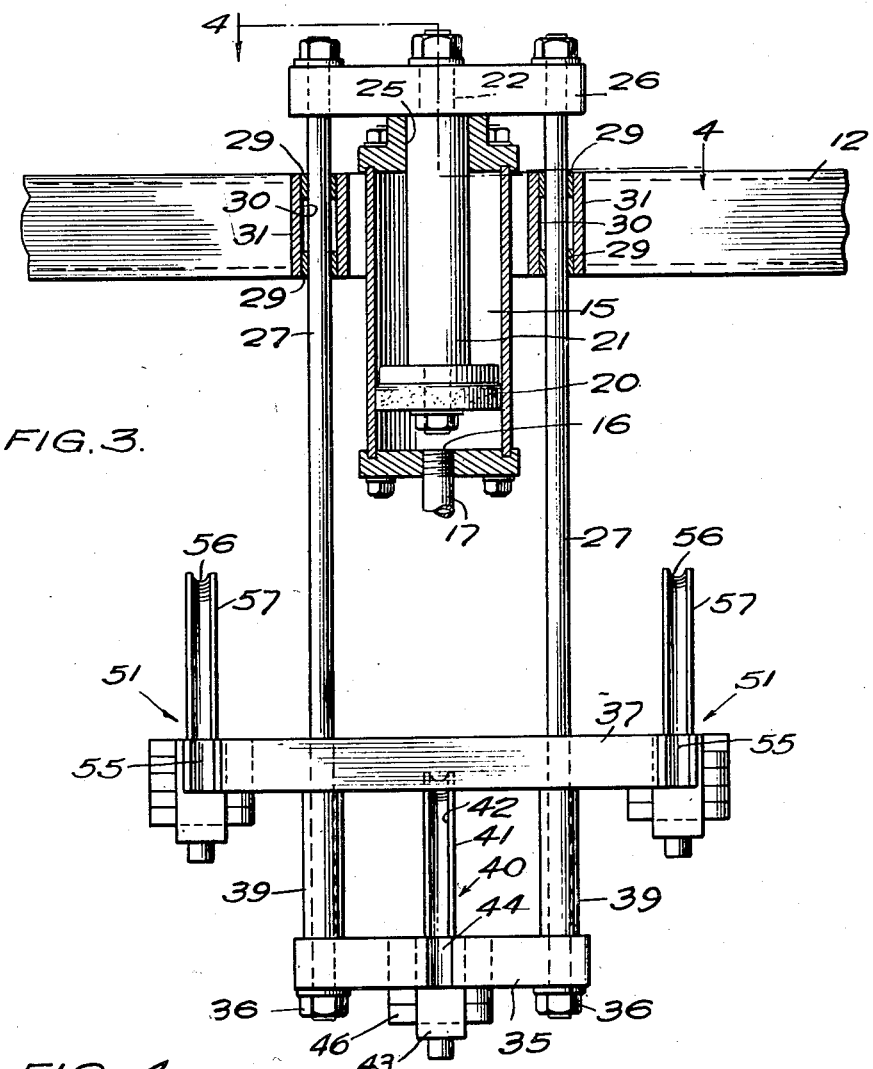
Fig. 3 is an enlarged, fragmentary, vertical section taken along line 3—3 of Fig. 2.
Figure 4:
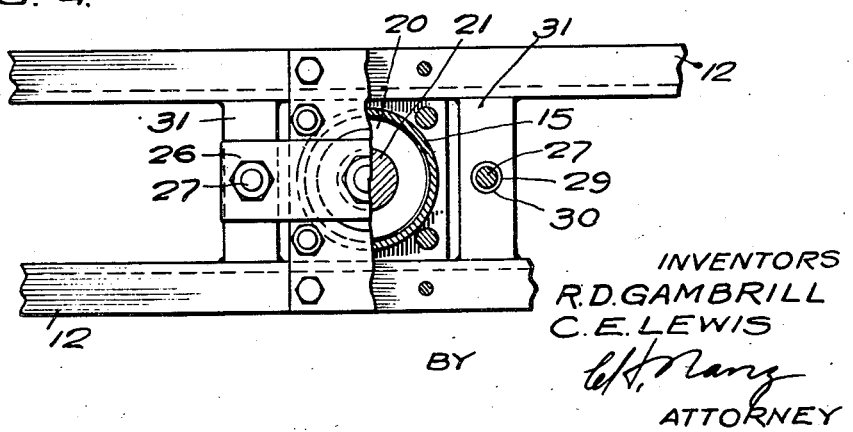
Fig. 4 is a horizontal, partial section of a portion of the apparatus.

The pipe 17 (Figs. 1 and 3) serves to supply or exhaust compressed air to the lower portion of the air cylinder 15 when a conventional threeway valve 19 secured to the frame 11 is appropriately actuated. When the valve 19 is actuated to supply compressed air from a supply pipe 18 leading from a suitable source of supply (not shown), a piston 20 (Fig. 3) mounted in the air cylinder 15 is forced upwardly. When the valve 19 is actuated to connect the pipe 17 with an exhaust pipe 23 (Fig. 1), the piston 20 returns by gravity to its lowermost position, as shown in Fig. 3.

A piston rod 21 (Fig. 3) having a reduced end portion 22 is secured to the piston 20 and is slidably mounted in a guide passage 25 formed in the upper end of the cylinder 15. A crosshead 26 is secured at the center thereof upon the reduced end portion 22 of the piston rod 21 and the upper ends of rods 27—27 are fastened to the ends of the crosshead. The rods 27—27 are mounted slidably in bushings 29—29 secured in bores 30—30 formed in blocks 31—31 secured to the channels 12—12 at points equidistant from the cylinder 15.

A yoke 35 (Fig. 3) extending between the rods 27—27 is secured to the lower ends of those rods by nuts 36—36. A second and longer yoke 37 is mounted on the rods 27—27 above the yoke 35 and is supported thereon by spacers 39—39 positioned on the rods 27—27 between the yokes 35 and 37. The ends of the yoke 37 project equal and substantial distances beyond the rods 27—27.

A clamping unit 40 (Fig. 3) is secured to the yoke 35 midway between the rods 27—27. The clamping unit 40 includes a semicircular snubber 41 having a groove 42 formed in the semicircular portion thereof, a bracket 43 (Fig. 5) and a pair of jaws 45 and 46 hinged to the bracket 43. A notch 44 (Fig. 2) formed in the yoke 35 forms a continuation of the left end of the groove 42, as viewed in Fig. 2. The jaw 46 has a wedge-shaped passage 47 (Fig. 5) formed therein and one of a pair of wedge-shaped inserts 48—48 is slidably secured in the passage 47. The insert 48 has a long, rubber gripper 49 molded therein and the gripper 49 has a groove 53 formed therein. The jaw 45 is identical in construction with the jaw 46 and contains the other insert 48, which contains a gripper similar to the gripper 49.

The bracket 43 is secured to the snubber 41 near the right hand end of the groove 42, as viewed in Fig. 5. A latch 60 pivotally mounted on the jaw 45 serves to force the jaws 45 and 46 together. When the jaws 45 and 46 are forced together, the grooves illustrated by the groove 53 form a passage tangential to the right end of the groove 42, as viewed in Fig. 5, and the grippers securely grip a cable 50 positioned in the groove 42. If the cable 50 is pulled upwardly, the grippers are forced into closer engagement therewith by the interaction between the inserts 48—48 and the wedge-shaped passages, illustrated by the passage 47. The long rubber grippers exert an even pressure on the portion of the cable 50 gripped thereby and do not dig into or damage the periphery of the cable.

Two clamping units 51—51 (Fig. 3), which are identical with the clamping unit 40, are secured upon the extremities of the yoke 37. Two notches 55—55 formed in the yoke 37 are aligned with the ends of grooves 56—56 formed in a pair of snubbers 57—57 forming a part of the units 51—51.

Figure 1:
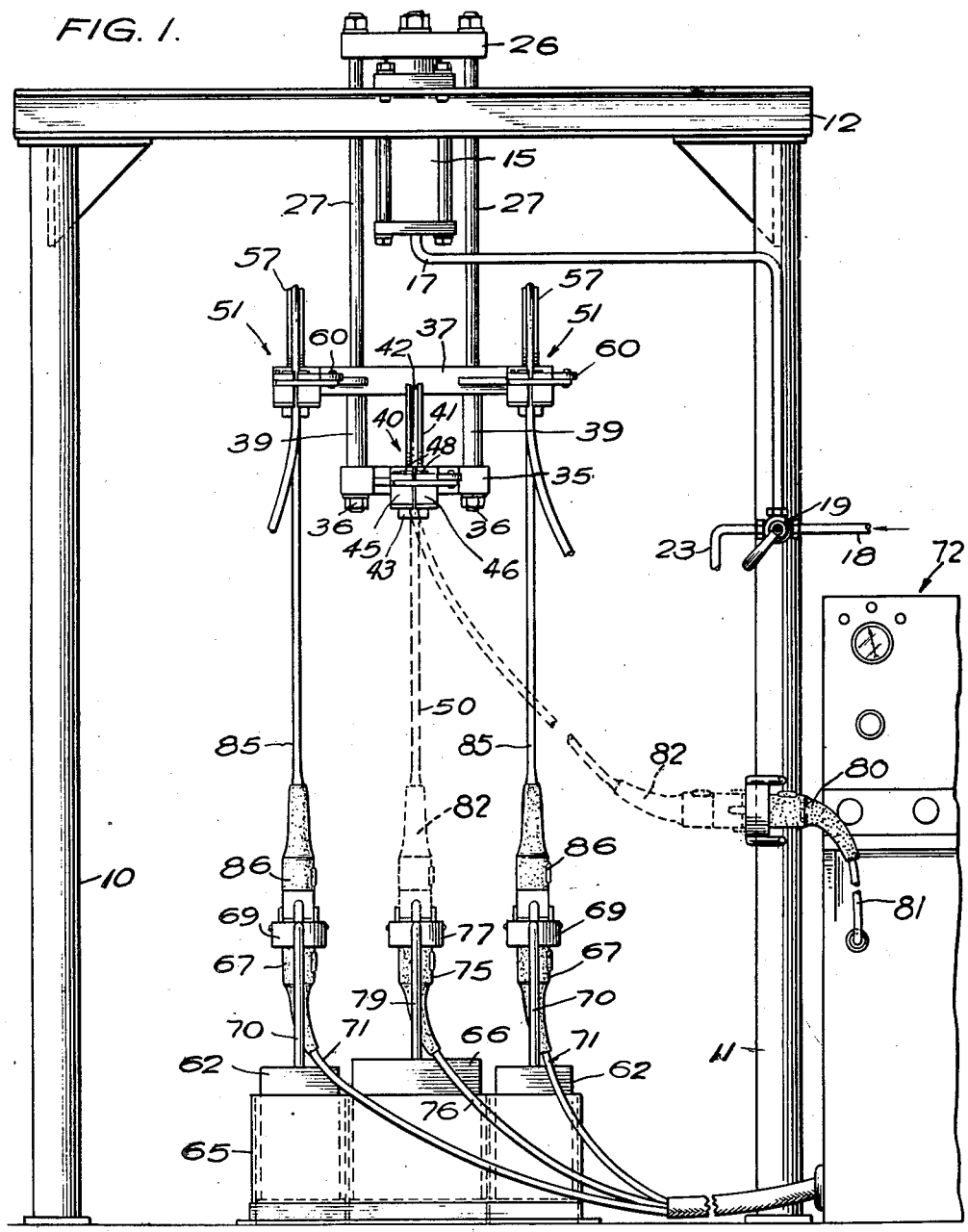
Figure 2:
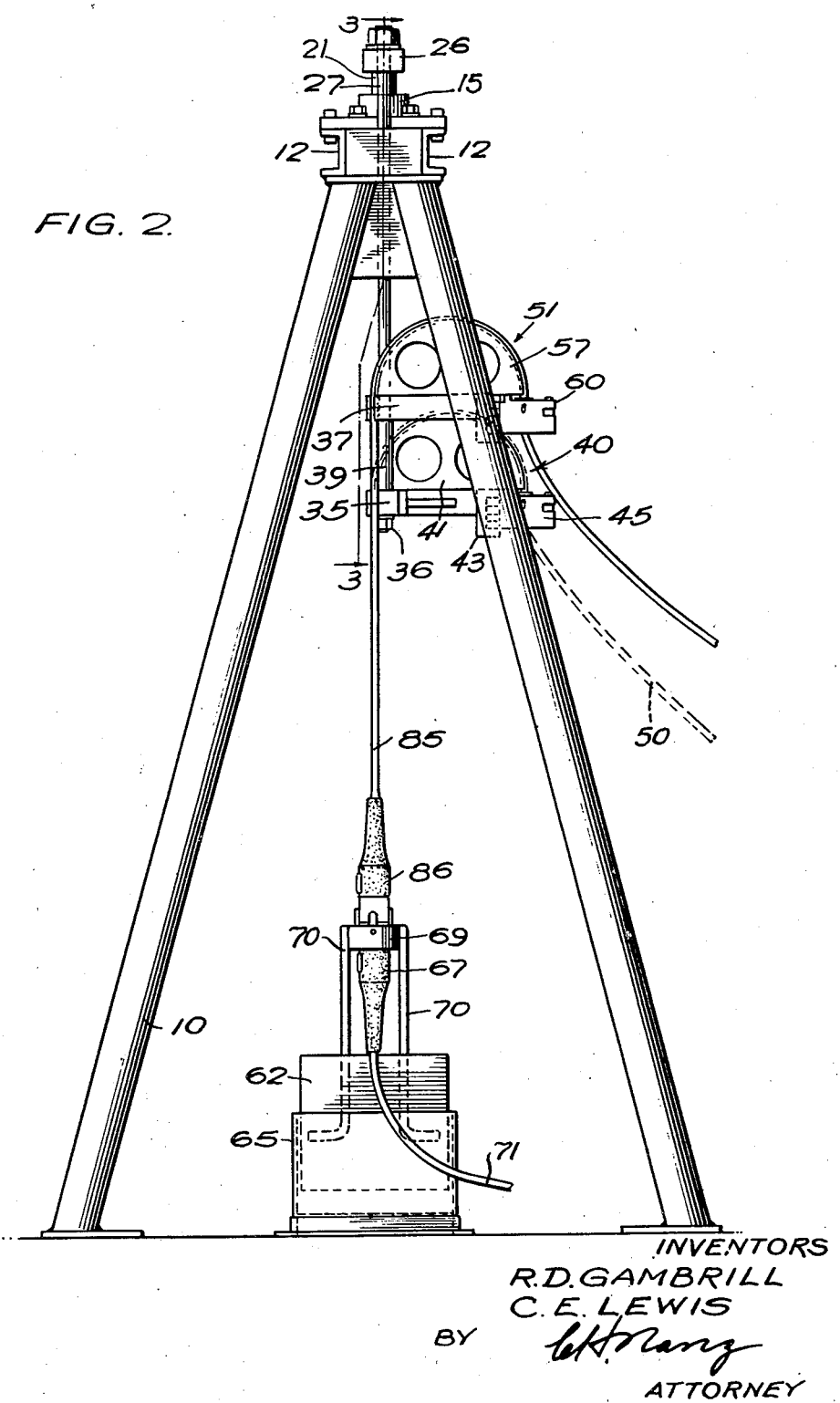
Fig. 2 is a fragmentary, side elevation of the apparatus with the elements thereof in positions different from those shown in Fig. 1.

A pair of weights 62—62 (Fig. 1) are positioned in a guide 65 centered beneath the left ends of the snubbers 57—57, as viewed in Fig. 2, and a heavier weight 66 is positioned in the guide 65 directly below the left end of the snubber 41. A pair of dummy cable terminals 67—67 are secured in collars 69—69 fastened by rods 70—70 to the weights 62—62 directly over the centers of gravity thereof. The cable terminals 67—67 are connected by cables 71—71 to a conventional test set 72. A third dummy cable terminal 75, connected by a cable 76 to the test set 72, is secured directly over the weight 66 by a collar 77 fastened to the weight 66 by a pair of rods 79—79 similar to the rods 70—70. The collars 69—69 are positioned directly below the notches 55—55 and the collar 77 is positioned in a similar manner with respect to the notch 44.

A dummy cable terminal 80, mounted on the frame 11, is connected by a cable 81 to the test set 72. The terminal 80 forms part of a circuit, including the test set 72 and the terminal 75. This circuit also includes the cable 50 when terminals 82—82 of the cable 50 are connected to the terminals 75 and 80. The terminals 75, 80 and 82—82 are of a type of cable terminals well known to those skilled in the art of cable making, and interlock mechanically with each other when they are connected.

In the operation of the apparatus to test a cable 85, of which only the ends are shown, a pair of terminals 86—86 on the ends of the cable 85 are placed in interlocking engagement with the dummy terminals 67—67, whereby the ends of the cable 85 are secured mechanically to the weights 62—62 and are connected electrically by the cables 71—71 to the test set 72. The ends of the cable 85 then are placed in the grooves 56—56, are drawn taut, and are clamped by the clamping units 51—51.

The valve 19 then is actuated to supply compressed air to the under surface of the piston 20, whereby the piston is forced upwardly. The piston 20, as it is forced upwardly, raises the clamping units 51—51 whereby the weights 62—62 are lifted in the guide 65 and held in the positions shown in Fig. 2 by the ends of the cable 85, whereby the ends of the cable 85 are tensioned by the weights 62—62, and the guide 65 prevents an operator from accidentally placing his foot under one of the weights. In testing cables whose diameters are approximately one-quarter of an inch, weights of about 200 pounds each have been found satisfactory to apply the necessary tension.

While the ends of the cable 85 are tensioned in this manner, the test set 72 is operated to supply a current to the cable 85 and measure certain electrical characteristics of the tensioned cable 85. After these measurements have been concluded, the test set 72 is turned off and the valve 19 is actuated to permit the compressed air holding the piston 20 in its raised position to escape from the cylinder 15 through the pipes 17 and 23. The piston 20, the elements supported thereby, and the weights 62—62, are then returned by the force of gravity to the positions in which they are shown in Fig. 1. The cable 85 then may be removed from the apparatus to free the apparatus for other testing operations.

If it is desired to test the cable 50 under a tension greater than the tension applied to the cable 85, one of the terminals 82—82 of the cable may be connected to the dummy terminal 75 and fastened to the clamping unit 40 in a manner identical with that in which the ends of the cable 85 were secured to the clamping units 51—51, as described hereinabove. The other one of the terminals 82—82 of the cable 50 to be tested then is connected to the terminal 80, and the valve 19 is actuated to lift the weight 66 by the cable 50, whereby the cable 50 is tensioned. Since the weight 66 is considerably heavier than the weights 62—62, the cable 50 is placed under a tension greater than was the cable 85. The cable 50 then is tested in a manner similar to the test of the cable 85.

An apparatus comprising an alternative embodiment of the invention is illustrated in Fig. 6. This apparatus is designed to test splices similar to a splice 184 in a cable 185 while under tension and includes a pair of frames, illustrated by a frame 110, identical with the frames 10 and 11. It also includes elements corresponding to all of the other elements carried by the frames 10 and 11 except that only a yoke 135 and a single clamping unit 140 are carried by rods, which rods are identical with the rods 27—27 and are illustrated by a rod 127, and no elements corresponding to the yoke 37 and the clamping units 51—51 are present. The clamping unit 140 and the yoke 135 are identical with the clamping unit 40 and the yoke 35.

In this modification, the weights 62—62 and 66 and the elements connected thereto are replaced by a weight 166 positioned below the clamping unit 140 in a guide 165. A post 179 secured to the weight 166 has a plate 180 secured thereto. A clamping unit 181 identical with the clamping unit 140 is secured to the plate 180. The clamping unit 181 is inverted with respect to the clamping unit 140. The combined center of gravity of the weight and the elements secured thereto is aligned with the axis of the splice 184.

In the operation of this modification of the invention the portion of the cable 185 positioned just below the splice 184 is secured to the clamping unit 180. The portion of the cable 185 below the splice 184 then is placed over the clamping unit 140, is drawn taut, and is secured thereto with the splice 184 positioned between clamping units 140 and 180. The ends of the cable 185 are then connected to a test set (not shown) similar to the test set 72 and the apparatus is operated to raise the weight 166 by the cable 185 whereby the splice 184 is tensioned. The test set then is operated to supply an electric current to and test the cable 185 while the splice 184 is under tension.

The apparatus embodying the invention places cables under a very large amount of tension rapidly and without damage, except that which may be caused by the tension per se. The clamping units exert only frictional forces upon the cables, and thus no damage is caused by the clamping units.

What is claimed is:

1. In an apparatus for testing cables while under tension including a test set, the combination of a frame including a cross beam at the top thereof, an air cylinder supported by the cross beam, a clamp carried by the piston of the cylinder for securing a cable including an electrical conductor to be tested, a weight positioned directly below the cylinder, means carried by the weight for securing a cable thereto, whereby the weight is lifted to tension a cable secured by the clamp and the securing means when the clamp is raised by the piston, and means for connecting the ends of the conductor of the cable to the test set.

2. In an apparatus for testing cables while under tension including a test set, the combination of a frame, an air cylinder supported by the frame at the top thereof, a snubber carried by the piston of the cylinder for snubbing a cable which includes an electrical conductor, the snubber being raised when the piston is actuated, a weight, means for securing the cable to the weight, whereby the weight places the cable under tension when the snubber is raised, and means for connecting an end of the conductor of the cable to the test set.

3. In an apparatus for testing cables while under tension including a test set, said cables having terminals on the ends thereof and comprising at least one conductor, the combination of a cylinder, a frame for supporting the cylinder in an elevated position, a crosshead secured to the piston of the cylinder, a pair of clamps for securing such a cable thereto at points a predetermined distance from the terminals of the cable, a pair of rods for securing the clamps to the crosshead, a pair of weights positioned directly below the clamps, and means including a pair of dummy cable terminals serving to attach the terminals of a cable secured by said clamps to the weights and to electrically connect the terminals of the cable to the test set.

4. In an apparatus for testing cables including a test set, the combination of a clamping unit including a snubber and a pair of jaws for securing over the snubber a cable which includes a conductor, means for raising the clamping unit, a weight, a clamping unit similar to the first-mentioned clamping unit for securing to the weight a cable secured to the first-mentioned clamping unit, whereby the weight is raised by the cable to tension the cable when the first-mentioned clamping unit is raised, and means for electrically connecting a conductor of the cable to the test set.

5. In an apparatus for testing cables including a test set, the combination of a pair of A-shaped standards, a cross beam secured to the apices of the standards, an air cylinder secured to the cross beam with the axis thereof vertical, a crosshead secured to the piston of the cylinder, a pair of rods secured to the ends of the crosshead in depending relationship, a yoke secured to the lower ends of the rods, a second yoke secured to the rods above the first-mentioned yoke, a clamping unit including a snubber secured upon the center of the first-mentioned yoke, a pair of clamping units including a pair of snubbers secured to the ends of the second yoke, a pair of weights of predetermined magnitude positioned below the last-mentioned damping units, a third weight of a greater magnitude than the first-mentioned weights positioned directly below the first-mentioned clamping unit, means for maintaining the weights directly below the clamping units, means for securing to the weights cables including electrical conductors secured to the clamping units, means for connecting the ends of the conductors of the cables to the test set, and means for raising the piston to raise the clamping units, the portions of the cable between the clamping units and the weights, and the weights secured to the ends of the cable to place said portions of the cable under tension.

6. In an apparatus for testing cables while under tension including a test set, the combination of a dummy cable terminal, a weight, means for securing the dummy cable terminal to the weight, means for connecting the dummy cable terminal to the test set, means for clamping a portion of a cable whose end is to be secured to the dummy cable terminal, and means for raising the clamping means to raise a cable secured to the dummy cable terminal, whereby the weight is raised and the cable is placed under tension.

7. In an apparatus for testing cables while under tension including a test set, the combination of a weight, a dummy cable terminal fastened to the weight for interlocking with a cable terminal of a cable to be tested, means for connecting the dummy terminal to the test set, whereby a conductor of a cable whose terminal is to be interlocked with the dummy cable terminal will be connected electrically to the test set and mechanically to the weight, a snubber for holding a cable interlocked with the dummy cable terminal, and means serving to raise the snubber and to hold it in an elevated position, whereby the cable raises the weight and the cable is placed under tension.

RICHARD D. GAMBRILL.
CLAY E. LEWIS.

REFERENCES CITED

The following references are of record in the file of this patent:

UNITED STATES PATENTS

| Number | Name | Date |
| --- | --- | --- |
| 1,499,546 | Oxley | July 1, 1924 |
| 1,927,045 | Parsons | Sept. 19, 1933 |
| 2,187,345 | Dinzl | Jan. 16, 1940 |
| 2,240,505 | Lessig | May 6, 1941 |
| 2,393,177 | Longfellow | Jan. 15, 1946 |